Feb. 3, 1925.

T. H. PHILLIPS, JR.

REMOTELY CONTROLLED SELECTIVE SYSTEM

Filed Oct. 17, 1917 3 Sheets-Sheet 1

INVENTOR
THOMAS H. PHILLIPS, JR.
BY
Herbert H. Thompson
ATTORNEY

Patented Feb. 3, 1925.

1,525,431

UNITED STATES PATENT OFFICE.

THOMAS HENLEY PHILLIPS, JR., OF BROOKLYN, NEW YORK, ASSIGNOR TO ELMER A. SPERRY, OF BROOKLYN, NEW YORK.

REMOTELY-CONTROLLED SELECTIVE SYSTEM.

Application filed October 17, 1917. Serial No. 196,991.

*To all whom it may concern:*

Be it known that I, THOMAS H. PHILLIPS, Jr., a citizen of the United States of America, residing at 3 Essex Street, Brooklyn, in the county of Kings and State of New York, have invented certain new and useful Improvements in Remotely-Controlled Selective Systems, of which the following is a specification.

This invention relates to the selective control of translating devices from a distance by means of a minimum number of line wires or by radiant energy. More specifically the invention relates to such a system in which the selection is accomplished by the duration or length of a sustained impulse or interruption of a sustained impulse.

One of the principal objects of this invention is to provide a system as outlined above which is simple and reliable in operation.

Another object is to provide means for adjusting or synchronizing the instruments at the sending and receiving stations, preferably, from the sending station.

Another object is to provide sending means for automatically timing the duration of the impulse, or interruption of the impulse, from the sending station.

Another object is to provide means operable from the sending station for locking the mechanism at the receiving station against interference.

A further object is to provide an answer back signalling system.

Other objects and advantages will appear as the invention is hereinafter developed.

Referring to the drawings which illustrate what I now consider the preferred forms of my invention.

My invention, as herein disclosed, comprises sending means, transmitting means, receiving means, selective means for controlling a plurality of translating devices and answer back signals. These devices will be each taken up in detail hereinafter.

The sending means may assume the form of a manually operable circuit controller, or an automatically operable one or both. I prefer to provide both. The automatic controller may assume various forms, one form only being illustrated in Figs. 1 to 5.

Figure 1:
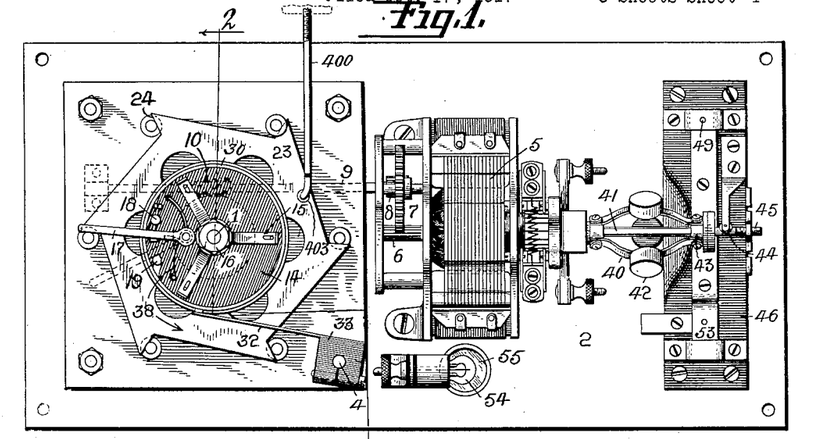
Fig. 1 is an inverted plan view, with the casing removed, of one form of sending mechanism.
Figure 2:
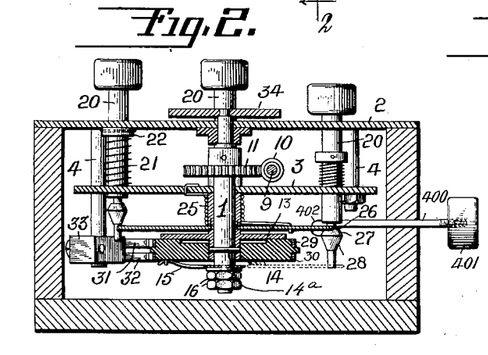
Fig. 2 is a section on the line 2—2 of Fig. 1.

The latter is shown as comprising a shaft 1 suitably journaled for rotation in a cover plate 2 and another plate 3 fixed thereto but spaced therefrom by means of posts 4. For rotating said shaft 1 suitable power means, such as an electric motor 5, is connected thereto and may be mounted on the plate 2. The connections may assume the form of a pinion 6, on the motor shaft, meshing with an idle gear 7, which meshes with a pinion 8 on a shaft 9 carrying a worm 10. The latter meshes with a worm wheel 11 on the shaft 1.

The shaft 1 may be provided adjacent one end with a disk 13 secured thereto by means of a pin 14ª passing through said shaft and through the hub of said disk. A disk 14 of insulation may be rotatably mounted on said disk 13 and frictionally held thereagainst by means of a plurality of springs 15 loosely and adjustably mounted on the lower end of shaft 1 by suitable means, such as nuts 16.

The disk 14 carries, on one surface thereof, a pivoted switch arm 17 biased in the direction of the arrow (see Fig. 1) by means of a spring 38. This switch arm 17 is adapted to engage one or the other of lugs 18, 19 located on disk 14 on opposite sides of said arm.

Means are provided for normally locking said disk 14 and its switch arm against rotation. This means may assume the form of a plurality of manually operable plungers or keys 20 slidably mounted in plates 2 and 3 and preferably equidistantly spaced on a circle with its center at the axis of shaft 1. Each key is preferably provided with a compression spring 21 spaced between a collar 22 on the key and the plate 3 and tending to urge the key to upward position. The arm 17 is of such length as to engage the lower end of any one of the keys 20 which happens to be in depressed position.

Means are provided whereby each of the keys when depressed is locked in depressed position and any previously actuated key is released on actuation of any other key. This means may assume the form of a disk 23 provided with as many radial shoulder portions as there are keys 20 and loosely mounted on the shaft 1. The disk 23 is given a bias in the direction of the arrow in Fig. 1 by means of a spring 25 surrounding the shaft 1 and secured at its opposite ends to the plate 3 and disk 23. Each key is provided with an undercut portion forming a shoulder 26 and with two oppositely extending conically shaped portions 27 and 28 as clearly shown in Fig. 2.

Slip rings 29, 30 provided on the periphery of disk 14, together with brushes 31, 32 mounted on a block of insulating material 33 secured to one of the posts 4, may be employed to lead current to the switch arm 17 and one or the other of contacts 18 or 19. The end of the shaft 1 opposite disk 14 may be provided with a disk 34 on which may be placed a pointer 35 adapted to cooperate with a pointer 36 on plate 2 to enable the operator to determine the speed of shaft 1. Each of the keys 20 is preferably provided at its upper end with an indicating symbol O, U, R, L, D, S, (see Fig. 3) and may also each be provided with a symbol 37 painted or otherwise mounted on cover plate 2.

I prefer to drive the shaft 1 at a substantially constant speed and to accomplish this function a speed responsive controller may be employed. This controller may assume the form of a governor 40 the fly weights 42 of which are connected to the motor shaft 41 and to a sleeve 43 slidably mounted on said shaft. The sleeve 43 carries a contact 44 adapted to engage a contact 45 adjustably secured to a block of insulation 46 in turn secured to cover plate 2.

Figure 4:
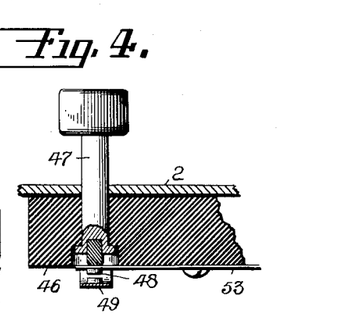
Figs. 4 and 5 are fragmentary details of certain of the parts shown in Figs. 1 and 3.

The electrical connections of the above described automatic circuit controller will be described hereinafter. As previously stated I also provide a manually operable controller. Any suitable form of circuit closer might be employed for this purpose. As shown in Fig. 4 I have provided a circuit closer comprising a key 47 slidably mounted in cover plate 2 and block 46 and adapted to move a spring contact 48 against its spring action into engagement with a contact 49. The key 47 is preferably also provided with an indicating symbol, such as I, on its head and with indicia 37 similar to those of keys 20.

Figure 5:
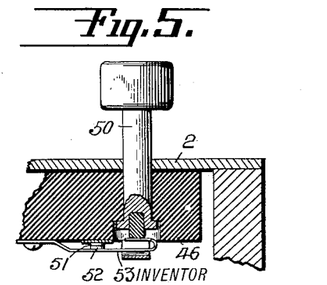

In addition to the above described controllers I prefer to provide also a manually operable circuit breaker which may assume the form illustrated in Fig. 5. A key 50, similar to key 47 and provided with an indicating symbol K, is adapted to break normally closed contacts 51, 52 by depressing the key against the action of its spring 53. A light or other signal 54 mounted on cover plate 2 and visible through a glass covered opening 55 in the latter completes the structure of the sending means.

Figure 3:
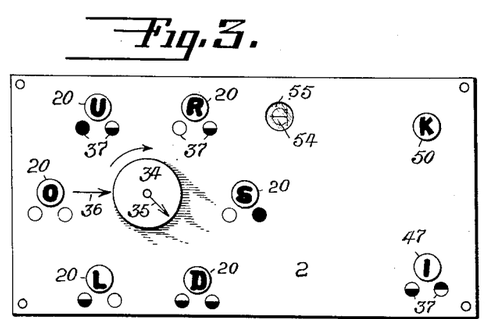
Fig. 3 is a top plan view of the structure shown in Figs. 1 and 2.
Figures 10, 11, 12:
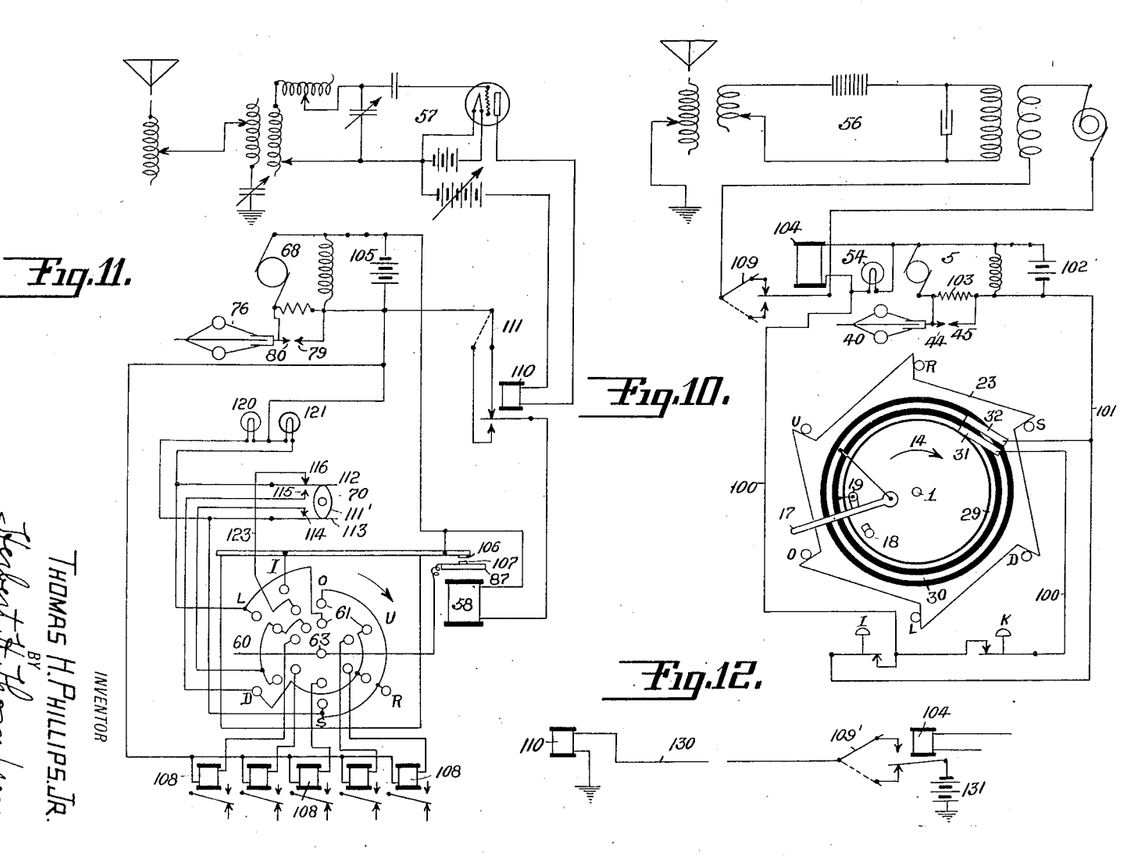
Figs. 10 and 11 are wiring diagrams of a preferred form of the invention, Fig. 10 illustrating the connections at the sending or controlling station, and Fig. 11 at the receiving or controlled station.
Fig. 12 is a wiring diagram of a modified form of transmission means and Fig. 13 is a fragmentary, partly diagrammatic, detail elevation of a modified form of selective means.

The electrical connections and operation of the sending means may be understood by reference to Figs. 1, 3 and 10. I prefer to use the automatic sending switch as a normally open one so that the contact 19 is employed. The switch 17, 19 is connected in series with the normally closed switch K by means of conductors 100 and 101 and the switch I is shunted across these conductors. The motor 5 is shown as shunt connected to a battery or other source 102. I prefer to have this motor running constantly at a constant predetermined speed and for this purpose I have shown a resistance 103 in series with the armature of the motor and connected at its terminals to the governor contacts 44, 45.

It will be seen that the circuit between conductors 100 and 101 is normally open as the normal position of the switch 17, 19 is open, as indicated in Fig. 1, with the key O depressed. Now let us suppose that the shaft 1 is making a complete revolution in one second and that the key U is depressed. The key O is released, the disk 14 is rotated in the direction of the arrows in Figs. 1 and 10 and after a slight interval of time the arm 17 contacts with lug 19. Contacts 17, 19 remain closed until the outer end of arm 17 engages the lower end of key U when the contact is disengaged from contact 19 and engaged with lug 18 thus opening the circuit between conductors 100 and 101 and stopping rotation of disk 14. Thus by the above operation the circuit 100, 101 is closed for slightly less than one-sixth of a second. If key R had been depressed instead of key U the circuit would have been closed for slightly less than two-sixths of a second etc.

The circuit may also be closed between conductors 100, 101 by operating key I and keys O, U, R, S, D, L may be operated without affecting the circuit by first operating key K and holding the latter depressed.

While the conductors 100, 101 might be directly connected to the transmission mechanism, I prefer to effect the control through a relay 104 connected in series with battery 102, across said conductors. The indicating light 54 may be connected in shunt with relay 104 and will then indicate when the sending means is operated.

While my invention is not restricted to use in connection with radio transmitting means I prefer at this time to employ the latter. The specific details of the wireless system employed form no part of the present invention, and for this reason I have selected for the purpose of illustration, a conventional set well recognized in the art. The wireless transmission is shown as comprising a sending set 56 and a receiving or detecting set 57 (see Figs. 10 and 11).

That part of the system which I term the receiving means may consist of any form of translating device adapted to cause movement of a mechanical element on electrical energization or deenergization. Thus electromagnets 58 may be employed. (See Figs. 6, 7 and 10.)

The selective means preferred by me at this time comprises a switch arm (or arms) controlled by the receiving means and automatically positioned with respect to a plurality of contacts in accordance with the impulse received by the receiving means.

One specific embodiment of such selective means is shown in Figs. 6, 7, 8, 9 and 11. The switch arm is shown in the form of a resilient arm 60 mounted on the outer end of a shaft 63 suitably journaled in plates 62, 65. The last mentioned plates, of which the one 62 is preferably made of insulating material are mounted in juxtaposition with respect to each other but in spaced relation with respect to a plate 67 by means of posts 66. The plate 67 may be secured to the frame of the electric motor or other power means 68 which may be in all respects similar to motor 5. The shaft 63 has secured thereto at its inner end a ratchet disk 64, said shaft terminating with said disk. The last mentioned disk may be frictionally driven by a gear wheel 69 secured to a shaft 70 journaled in plate 67. The shafts 63 and 70 although in alignment are not connected to each other except through the gear 69, disk 64 and a friction disk 82 mounted between the latter. A spring 71, adjustably connected at the outer ends of two of the posts 66 and engaging at its central portion, the shaft 63, may be employed to adjust the frictional torque between the gear 69 and disk 64. Suitable gearing, such as a train of gears, 73, 72, 74, 75, is employed to drive the gear 69 from the shaft of motor 68 and for the purpose of maintaining the speed of the motor 68 substantially constant a governor 76 similar to the governor 40 may be employed. The governor shaft may be rotatably mounted in a bracket 77 secured to the frame of motor 68 and a pinion 78 mounted on the governor shaft and meshing with gear 72 may be employed to drive the governor. An adjustable contact 79 mounted on but insulated from bracket 77 and cooperating with the end 80 of the governor shaft, may be employed to control the motor connections.

In order to control the position of ratchet disk 64, and consequently arm 60, from the receiving means 58, a centrally pivoted pawl lever 81 may be employed. Preferably this lever is made T-shaped comprising arms 83, 84, 85, rigidly connected to each other and pivoted at their junction to the plates 67 and 65. The electromagnets 58 are adapted to operate the arm 83 in one direction and a spring in the other. Thus a spring 86 (Fig. 6) may be employed to bias the arm in a ratchet engaging position and the arm 84 provided with an armature 87 adapted to be attracted by the magnets 58 mounted below said armature by means of a bracket 88 secured to two of posts 66.

In order to lock the arm 60 against operation by interference I provide means controlled by electromagnets 58 for locking the disk 64 against operation preferably when an impulse of more than a predetermined length is impressed on said electromagnets. One form of such means is clearly illustrated in Fig. 7. The angular movement of the lever 81 on energization of electromagnets 58 is restricted by means of a segmental gear 89 adapted to mesh with teeth provided on shaft 63 when the magnets 58 are energized, and pivotally connected to the free end of arm 85; to an extent allowing the arm 83 to move out of the path of the ratchet teeth but not sufficient to allow a lug 90 on arm 85 to move into the path of a stop pin 91 mounted on ratchet disk 64. However, if rotation of disk 64 and shaft 63 is permitted for a sufficient length of time the segment 89 will be moved downwardly until it passes under shaft 63, when arm 85 will be permitted to move the lug 90 into the path of pin 91. A spring 92 connected at one end to arm 85 and at the other to segment 89 may be employed to return the latter to upper position, which movement may be limited by a stop 93 mounted on the plate 65.

Figure 6:
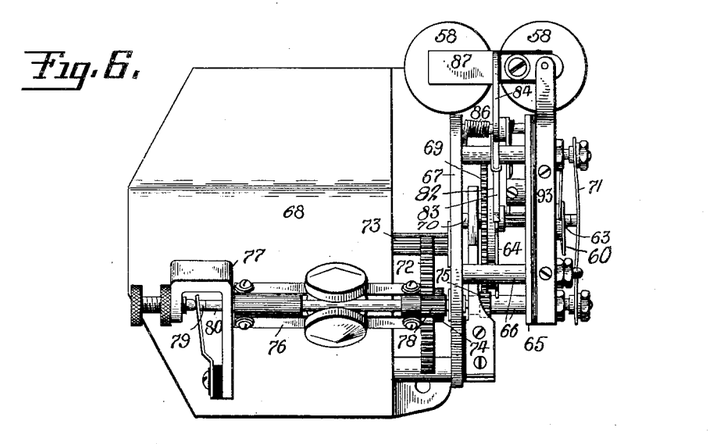
Fig. 6 is a plan view of one form of my receiving and selective means.
Figure 7:
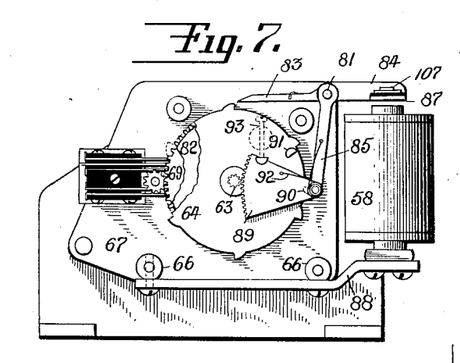
Fig. 7 is an end elevation of the apparatus shown in Fig. 6 with the end plate removed.
Figure 8:
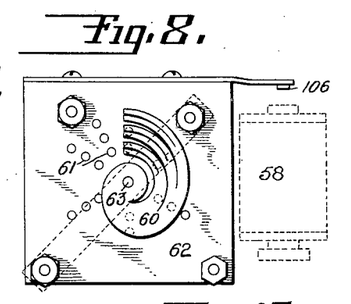
Fig. 8 is an end elevation of the mechanism shown in Fig. 6, the parts shown in Fig. 7 being omitted.
Figure 9:
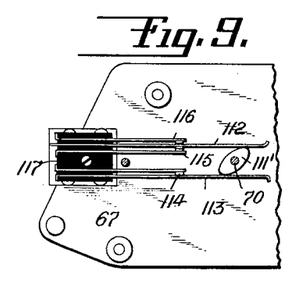
Fig. 9 is a fragmentary detail elevation of a part of the mechanism shown in Fig. 7 with the members 69, 82 and 64 removed.

A plurality of electrical contacts 61 may be mounted on plate 62 in a position to be engaged by arm 60 in its various positions for the purpose of controlling a plurality of translating devices.

One form of electrical connections of the selective means is indicated in Fig. 11. For convenience in explanation I will term the circular row of contacts 61 nearest the center, inner contacts, the intermediate circular row, middle contacts, and the outer row, outer contacts. Furthermore radial rows will be designated O, U, etc., corresponding to the various positions of the sending means. The switch arm 60 is shown as connected to one terminal of battery 105 through a switch 106, 107 of which the contact 106 is fixed and contact 107 carried by armature 87. Inner contacts U, R, S, D and L are each shown as connected to a corresponding one of translating devices, shown as relays 108, of which the other terminals are connected to the battery 105.

Let it be assumed that the motor 68 is connected and controlled in the same manner as motor 5, so as to rotate the shaft 70 at the same speed as shaft 1, i. e., one revolution per second. Then if magnets 58 are energized for a length of time slightly less than one-sixth of a second the pawl 83 will release the disk 64 and permit the arm 60 to rotate through one-sixth of a revolution. If the magnets 58 are energized longer than one-sixth of a second, but less than two-sixths of a second, the arm will rotate through two-sixths of a revolution, etc.

The circuit to the translating devices 108 cannot be closed while the arm 60 is wiping over contacts 61 as it is open at 106, 107 at this time.

The front contacts of relay 104 of the sending means may be connected through a switch 109 to the wireless sending set 56 and the front contacts of the sensitive relay 110 of the wireless receiving set 57 may be utilized to control the receiving means 58. Thus magnets 58 are shown as connected in series with a switch 111 battery 105, and the last mentioned front contacts.

With these preferred connections and the shafts 1 and 70 revolving at the same speed and the arms 17 and 60 in the position O, suppose that it is desired to select one of the translating devices 108. Thus supposing that it is desired to energize the translating device connected to inside contact 61 at the position U, all that is necessary is to depress the key U at the sending station. Any of the other translating devices may be selected in a similar manner. Although I prefer to accomplish the selection by employing the automatic sending switch, it is obvious that the key I may be employed for the same purpose if carefully operated with reference to time.

If the switch arm 60 is at position O and it is desired to lock the selector against interference, it is only necessary to press key I for a time greater than five-sixths of a second (under the conditions of speed assumed) which will cause the sector 89 to pass under pinion 63 to cause the lug 91 to engage lug 90. The position of the arm 60 corresponding to this position of lugs 91 and 90 is at I (Fig. 11) so that none of the translating devices 108 is energized nor can they be until magnets 58 are again deenergized. If the arm 60 occupies a position other than the position O it may be locked against operation by interference in a manner similar to that described above except that the operating impulse will be longer. For example, if the switch arm is at position U and the interference key at the sending station is depressed and held depressed the arm 60 will rotate almost a complete revolution, i. e. it will be between positions O and U when the sector 89 passes under the pinion 63. The lug 90 will now be in the path of the pin 91 but as the latter has already passed the position of this lug the switch arm will not be locked until the said pin 91 travels around to a position to engage the lug 90. This engagement will take place when the arm 60 reaches the position at I. Obviously if an interfering group of impulses is sent out by some one other than the operator at the sending station the magnets 58 will cause the arm 60 to be locked at I as at least one of these impulses will be longer than those I contemplate using in my apparatus.

In order to inform the operator at the sending station whether or not the selector switch at the receiving station is responding properly and also to inform him at any time of the condition of the apparatus at the receiving station I provide answer back signalling means. While this means may assume various forms I prefer to use a pair of lamps 120, 121 controlled by a flasher and certain of contacts 61.

One suitable form of flasher is shown in Figs. 6, 7, 9 and 11. The shaft 70 carries a cam 111' adapted to engage and operate movable contact arms 112 and 113 which are biased to a position in engagement with the relatively fixed contacts 115 and 114 respectively. The cam is adapted in its rotation to break engagement between contacts 112 and 115 and contacts 113 and 114 and practically simultaneously make contact between 112 and a fixed contact 116. The contacts 112 to 116 are insulated from each other and from the plate 67 which carries them by means of insulation 117. The lamp 120 is shown as having one terminal electrically connected to contact 113 and the following of the contacts 61: outer contact S, outer contact R and outer contact O. One terminal of the lamp 121 is connected to contact 112 and the following of contacts 61: outer contact L and inner contact O. The free terminals of the lamps 120 and 121 are connected to the terminal of the battery 105 opposite the one to which the arm 60 is connected. The contact 115 is connected to outer contact D, middle contact R and outer contact U; the contact 114 is connected to middle contact D, middle contact L and inner contact I; and contact 116 is connected to middle contact I. As the arm 60 is de-energized when it stops on row I of contacts 61 I provide a shunt connection 122 from outer contact I around switch 106, 107.

By tracing the above described circuits it will be found that when the arm 60 stops on row O of contacts 61 both lamps 120, 121 glow steadily, on row U lamp 120 is out and 121 flashing or flickering, on row S 120 glows steadily and 121 is out and so on, as indicated by the corresponding indicia 37 on plate 2 (see Fig. 3).

If the operator depresses one of the keys, say key R, and the arm 60 at the receiving station takes position R an answer back signal will be given corresponding to indicia 37 below key R, i. e., lamp 120 will glow steadily and lamp 121 will flash. If any other answer back signal is given, for example, two lights flashing together, the operator will be apprised that the sending and receiving mechanism are out of synchronism. Synchronism may then be restored in either of two ways, i. e., by depressing keys O and I successively or by holding down key K and then depressing the key corresponding to the answer back signal previously received. In the first case, both the arm 60 and arm 17 will be restored to position O. The operator may check up the speed of the shaft 1 at any time by the revolution of pointer 35 (see Fig. 3) and may adjust the speed if necessary by adjusting the contact 45 of governor 40.

The system as above described is susceptible to modification, in various ways, both in mode of operation and in structure. Thus by throwing switches 109 and 111 to dotted line position as indicated in Figs. 10 and 11, the system instead of depending on the duration or length of the transmitted and received impulses would depend on the length of interruption of a sustained impulse. Furthermore, instead of employing radio transmission means the stations may be connected by one or more line wires.

Fig. 12 illustrates my invention adapted for use with a single line wire 130, the latter connecting the relays 110 and 104. The line may be energized by means of a battery or other source 131 connected to the armature of the relay 104. A switch 109' similar to switch 109 may be provided for a similar purpose.

Figure 13:
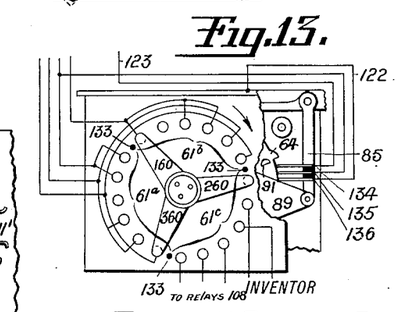

The selective means may be modified in various ways. Thus the contacts 61 instead of being grouped in a plurality of concentric rows may be all arranged on the arc of the same circle as indicated in Fig. 13. In this figure the contacts are grouped as indicated at 61ª, 61ᵇ, and 61ᶜ. Three equiangularly spaced arms 160, 260 and 360 may be substituted for the single arm 60 and the speed of rotation of the shaft 70 accordingly cut down to one-third. The position of arms 160, 260 and 360, in this form of mechanism, corresponding to the position I of arm 60 in Fig. 11 is that position in which the arms are over raised insulating lugs 133. In this position the arms 160, 260, 360 do not engage any contacts but the answer back signals 120, 121 are controlled by contacts 134, 135, and 136 insulated from each other and corresponding to the outer, inner and middle contacts of row I of contacts 61 respectively (see Fig. 11). The contacts 134, 135 and 136 are carried by the member 85 and fulfil not only the function of the corresponding contacts in Fig. 11, but also of the lug 90 (see Fig. 7). The position and operation of these contacts with respect to pin 91 is the same as that of lug 90 and needs no lengthy description. These contacts are adapted to engage each other when the top one is engaged by lug 91.

The selective instrument at the receiving station (Fig. 11) may be locked against interference by operating the sending keys in ways other than those previously described. Thus assuming that one of the keys 20 is depressed and it is desired to lock the receiving station against interference, one of the other keys 20 may be depressed to such an extent as to release the first mentioned key but not sufficiently to allow the disk 23 to engage the shoulder 26 (see Fig. 2) of the last mentioned key to lock the latter in depressed position. The switch 17—18 then remains closed as there is no key 20 depressed to open it, so that a sustained impulse is transmitted thus causing the receiving means to lock the selective means. Obviously the above procedure may be adopted instead of utilizing the key I when it is desired to synchronize as previously outlined.

Instead of effecting the release of all of the keys 20 in the manner above described, the same result may be accomplished by pushing a rod 400 (see Figs. 1 and 2) inwardly. This rod is shown as passing through an opening 403 in plate 23 and being turned over at 402. The button 401 at the outer end of rod 400 may be detachably secured to the latter by means of screw threads, so as to facilitate the removal of the plate 2 for the purposes of inspection.

The form of my invention illustrated in Figs. 10 and 11 is particularly adaptable for use in controlling an aeroplane from a station on the ground or on another aeroplane. Thus the translating device 108 may be utilized to control the steering devices of the aircraft, the positions O, U, R, S, D, and L herein referred to, giving the following controls, off, up, right, straight, down and left, respectively.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. In combination, sending means, receiving means, radio transmitting means connected to said sending and receiving means, selective means controlled by said receiving means, answer back signalling means controlled by said selective means and means for preventing operation of said signaling means when said selective means is operating.

2. In combination, sending means, remotely located selective means, radio transmitting means between said sending and selective means, means for causing said selective means to assume positions depending upon the impulses transmitted and means for positioning said sending means in accordance with said selective means without causing actuation of said transmitting means.

3. In combination, a rotatable switch arm, a remotely located selector switch, means including a radio transmitting system for causing said selector switch to rotate substantially in synchronism with said arm and means for preventing rotation of said selector switch upon continuous rotation of said arm for more than a predetermined time.

4. In combination, means for sending impulses of different lengths, receiving means, selective means controlled in accordance with the length of impulse received by said receiving means and means responsive to a comparatively long impulse sent from said sending means for locking said selective means in a predetermined position.

5. In combination, sending means including a plurality of keys, receiving means, radio transmitting means connected to said sending and receiving means, selective means controlled by said receiving means, answer-back signalling means controlled by said selective means, and indicating symbols adjacent said keys, each symbol corresponding to the answer-back signal sent in response to actuation of the key adjacent that symbol.

6. Selective means comprising a rotatable member, means normally preventing rotation of said member, means for releasing said preventing means to permit rotation of said member and means called into action by a prolonged actuation of said releasing means for preventing rotation of said member.

7. In combination, a selective device, means controlled by the length of a received impulse for controlling said selective device and means responsive to a prolonged impulse for locking said selective device in a fixed predetermined position.

8. In combination, a plurality of contacts, means for selecting certain of said contacts depending on the duration of a received impulse and means responsive to a prolonged impulse for locking said selecting means in a predetermined position.

9. In combination, a plurality of translating devices, means responsive to the length of a received impulse for selectively controlling said translating devices and means responsive to a prolonged impulse for locking said selective means in a predetermined position.

10. In combination, selective means, receiving means, a movable stop and means for moving said stop into the path of said selective means on prolonged energization of said receiving means.

11. In combination, a rotatable selective switch, means for preventing rotation of said switch, means comprising an electromagnet for actuating said preventing means and means for preventing rotation of said switch on prolonged energization of said electro-magnet.

12. In combination, a normally rotating translating device, a plurality of contacts, selective means normally connected to said device for selecting certain of said contacts and receiving means for controlling said selective means in accordance with the duration of a received impulse.

13. In combination, a selective switch, means for actuating said switch, a plurality of stops for preventing actuation of said switch and receiving means for successively causing one of said stops to permit actuation of said switch and another of said stops to stop actuation of said switch, in response to a prolonged impulse.

14. In combination, a selective switch, a plurality of stops for preventing actuation of said switch, and means responsive to an impulse of a predetermined length for moving one of said stops to disengaged position and responsive to a longer impulse for moving another of said stops to engaging position.

15. In combination, a selective device, a plurality of stops for preventing actuation of said device, one of said stops being normally active and another normally inactive, means including an electro-magnet for controlling the position of at least one of said stops, a rotatable shaft and means actuated by said shaft for controlling the position of another of said stops.

16. In combination, a selective switch, a ratchet disk connected to said switch, normally rotating power means frictionally connected to said disk and an electro-magnetically controlled pawl cooperating with said disk for stopping said disk in any one of a plurality of positions.

17. In combination, a selective switch, means for actuating said switch, means including a ratchet disk and a plurality of stops for preventing actuation of said switch, electromagnetic means for actuating said stops and means for retarding the actuation of one of said stops.

18. In a radio selective system, a receiver comprising a multipoint selective switch, a translating device for actuating said switch and means controlled jointly by said switch and translating device for giving a distinct signal for each position of said switch.

19. In a radio selective system, a receiver comprising a multi-point selective switch, power means for actuating said switch, a flasher operated by said power means and means including said flasher and certain of the points of said switch for giving a distinct signal for each position of said switch.

20. In combination, a plurality of translating devices, a selective device for controlling said translating devices, constant speed means constantly tending to rotate said selective device, means for preventing rotation of said selective device, and means responsive to impulses of radiant energy for actuating said preventing means to permit rotation of said selective device to an extent proportional to the duration of a received impulse.

21. In combination, a selective device, a substantially constant speed translating device normally tending to actuate said selective device, and means responsive to impulses of radiant energy for causing said translating device to actuate said selective device to a position depending on the duration of a received impulse.

22. In combination, sending means, receiving means, radio transmitting means connected to said sending and receiving means, a plurality of contacts, a selector switch controlled by said receiving means for selecting certain of said contacts depending on the duration of a received impulse, answer back signalling means controlled by said selector switch, and means for preventing operation of said signalling means while said selector switch is in operation.

23. In combination, sending means, remotely located selective means, transmitting means between said sending and selective means, means controllable from said sending means for causing movement of said selective means in a given direction, and means controllable from said sending means for preventing further movement of said selective means in said direction on sustained actuation of said sending means.

24. In combination, sending means, remotely located selective means movable to various positions, transmitting means between said sending and selective means, and means responsive to prolonged actuation of said sending means and movable into the path of said selective means for holding said selective means in a predetermined position.

25. In a system for selectively controlling objects at a distance, a sending switch, electrical power means for actuating said switch, a selector switch, electrical power means for actuating said selector switch, a plurality of contacts engageable by said selector switch, means responsive to impulses controlled by said sending switch for causing said selector switch to remain in engagement with any desired one of said contacts, and means for maintaining the speeds of said power means substantially constant.

26. In a system for selectively controlling objects at a distance, a sending switch, electrical actuating means therefor, a selector switch, a plurality of contacts engageable by said selector switch, means responsive to impulses controlled by said sending switch for preventing movement of said selector switch beyond any desired one of said contacts, electrical actuating means therefor, and adjustable means for causing the speeds of said actuating means to bear a predetermined relationship.

27. In a system for selectively controlling objects at a distance, a sending switch, an electric motor for actuating said sending switch, a selector switch, an electric motor for actuating said selector switch, a plurality of contacts engageable by said selector switch, means responsive to impulses controlled by said sending switch for maintaining the selector switch in engagement with any desired one of said contacts, and speed responsive means for automatically maintaining the speeds of said motors substantially constant.

28. In combination, a rotatable switch arm, a radio transmitting system, means normally tending to rotate said arm, means for restraining said arm from rotation, means for releasing said arm to permit rotation thereof, means for causing said arm to operate said radio transmitting system substantially continuously during rotation of said arm, a selector switch remotely located with respect to said rotatable switch arm, and means controlled by the impulses sent by said radio transmission system for causing said selector switch to rotate substantially in synchronism with said arm.

29. In combination, sending means, a selector switch, means for actuating said switch, a plurality of contacts engageable by said switch, means responsive to impulses controlled by said sending means for causing said selector switch to select and remain in engagement with any desired one of said contacts, and means for positioning said sending means in accordance with said selector switch without causing actuation of said sending means.

30. In combination, sending means, remotely located constant speed selective means, radio transmitting means between said sending and selective means, and means called into action by a prolonged actuation of said sending means for locking said selective means in a predetermined position against actuation by interference.

31. In combination, sending means, a remotely located selector switch, means constantly tending to rotate said switch, means for maintaining the speed of the second mentioned means substantially constant, means for preventing rotation of said selector switch, means controllable from said sending means for actuating said preventing means to permit rotation of said selector switch in a given direction, and means called into action by a prolonged actuation of said sending means for preventing further movement of said switch in said direction.

32. In combination, sending means, a remotely located selector switch, means for actuating said switch, a plurality of contacts engageable by said switch, means responsive to impulses controlled by said sending means for causing said switch to select and remain in engagement with any desired one of said contacts, and means controllable by said sending means for synchronizing said sending and selective means.

33. In combination, a normally rotating translating device, means for maintaining the speed of rotation of said device substantially constant, a plurality of contacts, means normally connected to said device for selecting certain of said contacts, and receiving means for controlling said selective means in accordance with the duration of a received impulse.

34. In combination, a rotatable switch arm, a remotely located selector switch, means including a radio transmitting system for causing said selector switch to rotate continuously during rotation of said arm and substantially in synchronism therewith, a plurality of contacts engageable by said switch, and means controllable by said arm for causing said switch to remain in engagement with any desired one of said contacts.

In testimony whereof I have affixed my signature.

THOMAS HENLEY PHILLIPS, Jr.